March 28, 1939. T. H. JENKINS 2,152,053
AIRCRAFT CONSTRUCTION
Filed Aug. 4, 1937 4 Sheets-Sheet 3
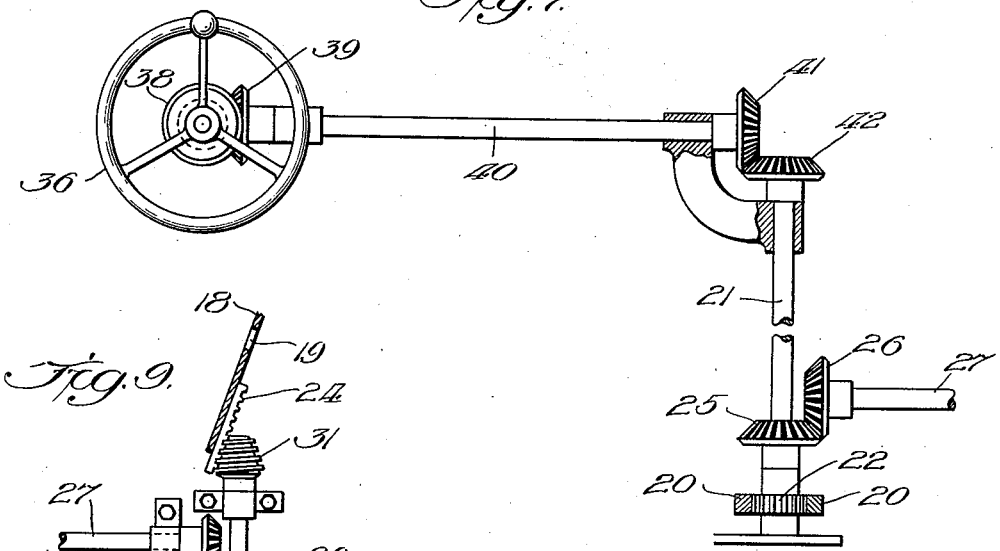
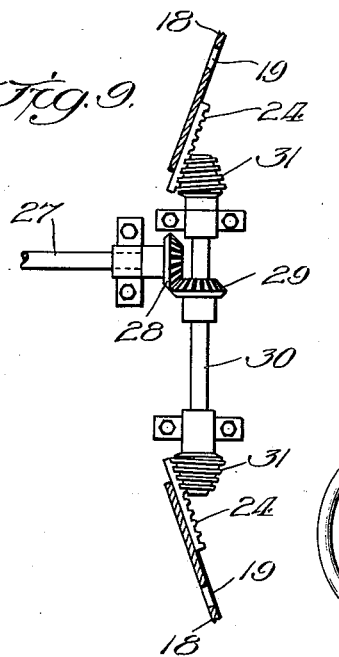
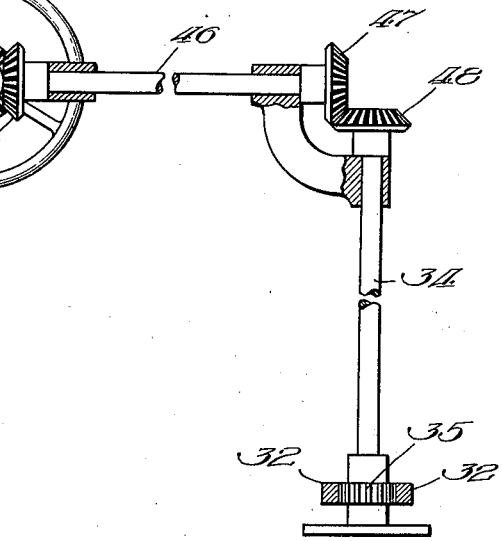

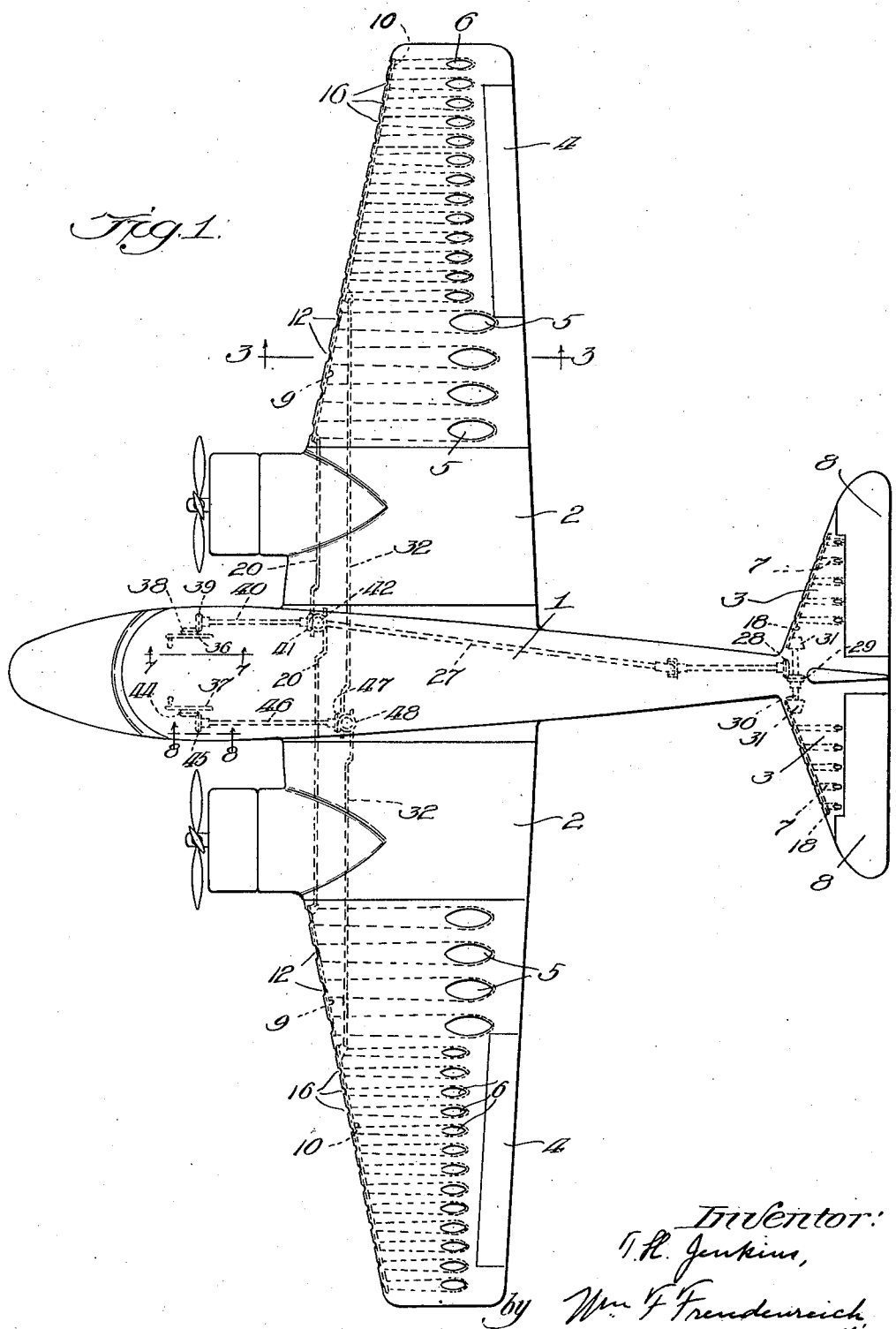

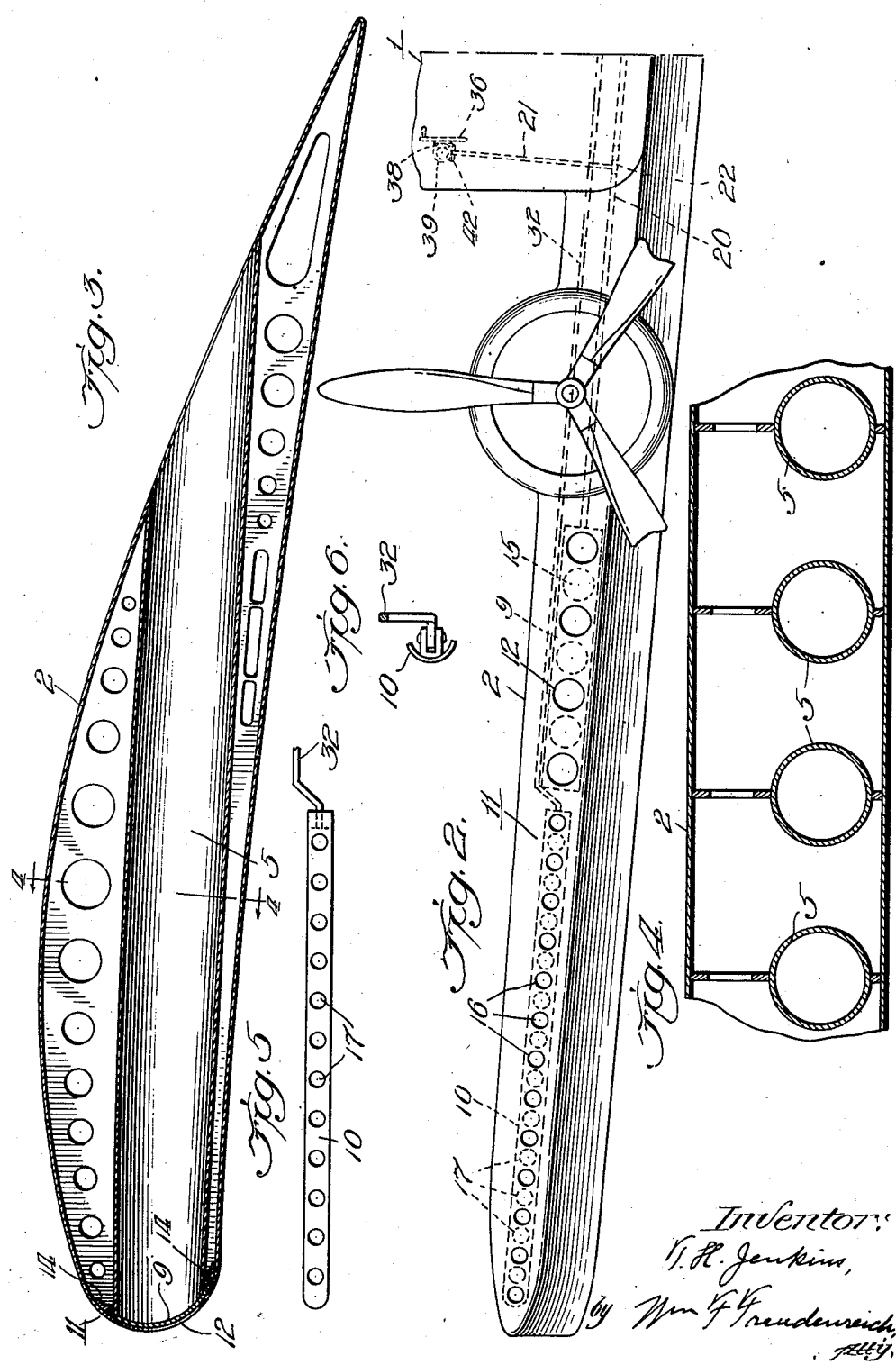

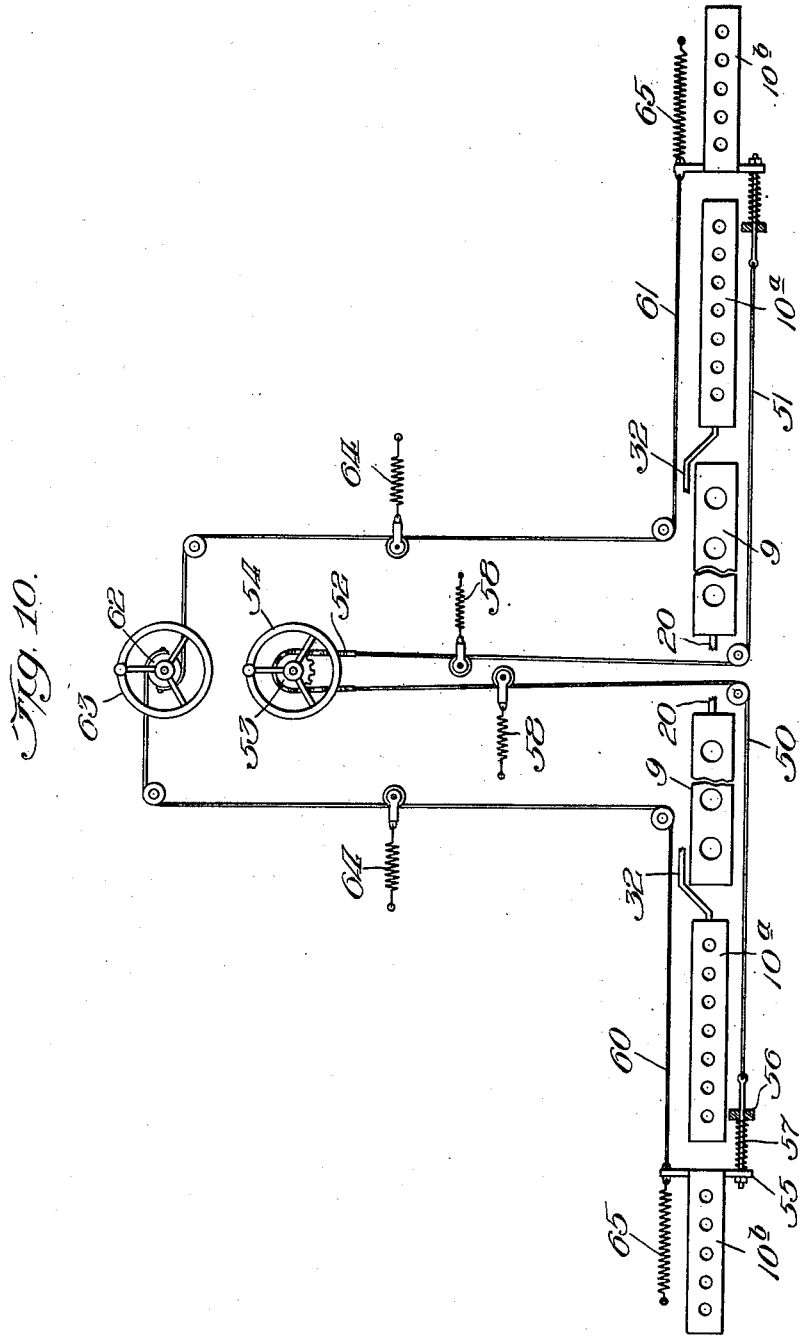

Patented Mar. 28, 1939

2,152,053

UNITED STATES PATENT OFFICE 2,152,053

AIRCRAFT CONSTRUCTION

Tazewell H. Jenkins, Chicago, Ill.

Application August 4, 1937, Serial No. 157,249

2 Claims. (Cl. 244—40)

The present invention has for its primary object greatly to improve the action of an airplane with respect to taking off, landing, straight away flying, banking and maneuvering, to greatly increase the speed, when desired, for a given power consumption or to reduce the power required for the attainment of a given speed and, further, to make it easy to adjust or compensate for unbalanced loading.

In carrying out my invention I make provision for varying greatly the air resistance of wings or planes while, at the same time, varying in a like manner the partial vacuum above the wings or planes. This I accomplish by providing the wings or planes with open ended tunnels distributed along the same and extending from the front edge rearwardly in such locations that the open rear ends are above the rear portions of the wings or planes. The tunnels are provided with suitable gates, valves, or other closures which permit the front ends thereof to be fully closed so that a wing or plane embodying my invention may, at times, operate in exactly the same manner as though the tunnels were not present. When the tunnels are fully open, the effective areas of the front edges of the wings or planes are reduced so that the planes or wings will offer less resistance to travel through the air. In other words, a portion of the air which would otherwise meet a solid front edge surface of a wing or plane, simply flows through the tunnels. The currents of air that pass through the tunnels emerge on the upper sides of the wings or planes, toward the rear, so that the vacuum on top of the wings or planes will be less than when the tunnels are closed and, consequently, the lifting action on the wings or planes is reduced. With the ordinary airplane wing, the resistance of the wing increases rapidly with increase in speed and, therefore, the power required to drive airplanes at high speeds is very great. By providing any desired number of tunnels in a wing, the extent to which the air resistance can be reduced may be made as great as desired so that, with the expenditure of a given amount of energy the speed of an airplane may be increased to any desired extent, within comparatively wide limits. The reduction of the air resistance is of course accomplished by a reduction in the lifting effect of the wing but, as the speed increases, a lesser lifting effect is required. The transition from a condition in which a wing or plane offers a maximum resistance to travel through the air to the condition where the resistance is at a minimum need not be made abruptly, for the tunnels may be opened to any desired extent between fully opened and fully closed positions, and the closures for the tunnels may be held in any desired adjusted positions for any desired length of time.

If all of the tunnel closures on both sides of the airplane are operated in unison, a balanced effect is maintained, and there is no tendency on the part of the airplane to tilt sidewise in one direction or the other. However, if the control of the tunnels be such that more air can pass through those on one side of the airplane than on the other, obviously, the lift on the latter side will be greater, and the plane will tend to tilt so as to bring the tip of one wing or plane higher than that of the corresponding member on the opposite side. In this way, banking of the airplane may be accomplished without the use of ailerons. Also, with such an arrangement as this, compensation may be made for unbalanced loading of the airplane so as to keep the airplane normally level.

When the usual ailerons are swung up or down, they, of course, increase the effective surface area at right angles to the direction of flight, thereby increasing the resistance to forward movement of the airplane. With my improved arrangement, the same control is secured as with the ailerons, not only without increasing the resistance to forward movement, but with an actual lessening of such resistance due to the removal of a part of the surface along the front edge of a wing. This elimination of the ailerons, if that be desired, as well as the provision of means for reducing the wing resistance during straight away flying, results in a great reduction in the stresses to which the wings are subjected, while flying, and the wings or planes need not, therefore, be made heavier or stronger than heretofore, in order to have a greater safety factor while flying at very high speeds and while banking, than is true of wings of ordinary construction. The elimination of the added resistance of the ailerons during banking, together with a portion of the effective area of the front edge of the wing structure, is especially important because the ailerons are located toward the outer ends of the wings and, therefore, pressure thereon acts through a considerable leverage.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a conventional airplane embodying the present invention; Fig. 2 is a front view, on a somewhat larger scale, showing approximately one-half of the airplane; Fig. 3 is a section, on a still larger scale, taken on line 3—3 of Fig. 1; Fig. 4 is a section on line 4—4 of Fig. 3; Fig. 5 is a front view of one of the tunnel controlling closures or gates; Fig. 6 is an end view of the parts shown in Fig. 5, looking toward these parts from the right in Fig. 5; Fig. 7 is a view partly in section and partly in elevation of one of the manual controls, the view being a section taken on line 7—7 of Fig. 1, but on a larger scale; Fig. 8 is a view of the same character as Fig. 7, taken approximately on line 8—8 of Fig. 1; Fig. 9 is a top plan view of the immediate operating means for the gates or closures associated with the tail of the airplane, fragments of the two closures being shown; and Fig. 10 is a more or less diagrammatic view, illustrating a modified arrangement of gates or closures, including two that serve as substitutes for the usual ailerons.

In the drawings I have illustrated my invention as applied to a monoplane including a body or fuselage 1, main wings 2, 2, and small tail planes 3, 3. The wings 2, in Fig. 1, are shown as being provided with the usual ailerons 4 along the rear edges. In accordance with my invention, each of the main wings has numerous parallel tunnels extending from the front edge to the rear and opening out on the upper side of the wing and increasing gradually in diameter from front to rear. By reason of this increase in diameter, the air entering the front ends of the tunnels is free to expand somewhat as it passes through the tunnels, thus reducing the resistance to the flow thereof. In the arrangement shown in Fig. 1, the tunnels in each wing are shown as being arranged in two groups, those of the inner group being indicated at 5 and those of the outer group at 6. The tunnels 6 do not extend rearwardly quite as far as the tunnels 5, as they lie in front of the ailerons. In each of the tail planes 3 are a series of tunnels 7 extending from the front edges of these planes toward the rear and opening out on top of the planes in front of the usual elevating planes 8, 8.

The front ends of the tunnels open out through the front edges of the wings or planes with which they are associated, and these open ends may be closed wholly or partly, at will, in any suitable way. I prefer that the closures for the tunnels shall be such that when they are in their closed positions, the front edges of the wings or planes will have substantially smooth rounded contours as in ordinary wing construction. In the arrangement shown, the closures are in the form of long curved plates slidably mounted upon the wings and each long enough to span all of the tunnels in a single group. Thus, one of the closures 9 is long enough to span all of the tunnels 5 in one of the wings, whereas each closure 10 cooperates with all of the tunnels 6 in one wing. The tunnels are shown as terminating just short of the front edge walls of the wings, so that the closures may be located between the front edge of the tunnels and these walls. With this arrangement, the walls need not be cut away over the entire areas of the closures but need only have holes cut into the same in registration with the tunnels. Thus, as best shown in Fig. 3, the front edge wall 11 of the wing 2 has openings 12 of the same cross sectional size and shape as the tunnels 5, registering with the latter tunnels. The closure or gate 9 is fitted at its long edges into guides 14, 14 arranged respectively above and below the tunnels; these guides holding the closure against the front wall of the wing. The closure itself contains holes 15 of the same size as the holes 12. The parts are so proportioned that in one position, that illustrated in Figs. 2 and 3, the holes 15 lie behind solid portions of the front edge wall of the wing, while solid portions of the closure extend over the holes 12. With the closure in this position, the wing functions in the same way as an ordinary, non-adjustable wing. When the closure 9 is drawn toward the right in Fig. 2, so as to bring the holes 15 and 12 into registration with each other, air may flow through the tunnels 5 and pass out through the upper side of the wing toward the rear edge.

Each of the main wings is provided with a row of holes 16 in front of the tunnels 6, and the corresponding closure 10 is provided with holes 17 which cooperate with the holes 16 in the same way as the holes 15 and 12 cooperate with each other.

The closures 18, 18, with their holes 19, 19, fragments of which are shown in Fig. 9, are mounted in the tail planes 3, 3 and in association with the tunnels there present, in the same manner as the closures in the main planes or wings are associated and cooperate with the latter and with the tunnels 5 and 6.

The various closures or gates may be operated in any suitable manner. In the arrangement shown, the closures 9, 9 and 18, 18 are all operated in unison with each other so that all of the tunnels 5 and 7 are either fully open, fully closed, or opened to the same extent. On the other hand, the closures 10 for the tunnels 6 are operated independently of the other four closures, but in unison with each other. The inner end of each of the closures 9 is connected to a rod 20 extending laterally into the fuselage. The inner ends of the rods 20 pass each other on opposite sides of a vertical shaft 21 having thereon a pinion 22, as best shown in Fig. 7; these inner sections of these rods being in the form of rack bars, such as the rack bar 24 in Fig. 9, so that when the shaft 21 is turned, the rods 20 are shifted lengthwise in opposite directions. In other words, by turning the shaft 21 in one direction, the closures 9 may be shifted from the positions corresponding to that illustrated in Fig. 2, to positions in which the openings 15 register with the openings 12, or in which these openings partially register. Then, upon turning the shaft in the opposite direction, the openings 12 may again be completely closed or more nearly closed than they previously were.

The shaft 21 has thereon a bevel gear 25 that meshes with a complementary gear 26 on the front end of a longitudinal shaft 27 that extends rearwardly into the tail. As best shown in Fig. 9, the rear end of the shaft 27 has thereon a bevel gear 28 meshing with a complementary gear 29 on a short transverse shaft 30. The shaft 30 has on its ends worm gears 31, 31 that mesh with the rack bars 24, previously mentioned, attached directly to the closures or gates 18 in the tail planes. Thus, the closures 18, 18 are moved in synchronism with the closures 9, 9.

To the inner end of each of the closures 10 is connected a rod 32 which extends into the fusilage. The inner ends of the rods 32 pass each other as do the rods 20, on opposite sides of a vertical shaft 34, as best shown in Fig. 8. The shaft 34 has thereon a pinion 35 meshing with teeth on the rods 32 which, like the rods 20, have inner sections in the form of rack bars.

Upon turning the shaft 34, the tunnels 6 on both sides of the plane may be opened or closed in unison, and the closures 10 may be brought to rest in any desired intermediate positions.

The shafts 21 and 34 may be turned by any suitable means. In the arrangement shown, both of these shafts lie behind the position of the pilot and, therefore, as shown in Figs. 1, 7 and 8, hand wheels 36 and 37, respectively, are provided adjacent to the pilot's position, and the shafts 21 and 34 are driven through suitable connections from these hand wheels. Thus, the hand wheel 36 has thereon a bevel gear 38 that meshes with a complementary gear 39 on the front end of a horizontal shaft 40. The shaft 40 has at its rear end a bevel gear 41 meshing with a similar gear 42 on the upper end of the shaft 21. Similarly, as shown in Fig. 8, the shaft 34 is driven from the wheel 37 through bevel gears 44 and 45, a horizontal longitudinal shaft 46 and gear wheels 47 and 48.

In taking off and landing, all of the closures or gates are kept in their closed positions so that the wings and planes function in the same way as ordinary wings or planes. During flight, either or both of the pairs of groups of tunnels in the main planes or wings may be opened. If all of them are opened, the wing resistance is reduced to a minimum and, therefore, with the same expenditure of power, very much higher speeds can be obtained than is the case with all of the tunnels closed. In maneuvering, if the pilot desires to dive as fast as he can, he simply opens all of the tunnels fully and, consequently, the ship will descent at a much greater speed than would be possible with wings of ordinary construction. When he wishes to come out of the dive, the tunnels may be gradually closed, permitting the air resistance of the wings to build up and produce a braking action to retard the speed of the ship. Similarly, in landing, the landing field may be approached at high speed and, through the closing of the tunnels, the speed may quickly be brought to a proper low landing speed. It will be seen that if a very low landing speed should be desired, the planes could be designed so as to make this possible, without limiting the airplane to an ineffectual low speed during actual flying.

In Fig. 10 I have illustrated, more or less diagrammatically, a modification which permits the ailerons on the main wings to be eliminated. To this end, each closure 10 is shown as being divided into two sections, 10a and 10b. The inner sections 10a are operated by the rods 32, as before, but the outer or endmost sections 10b are moved independently of the others. In the arrangement shown, cables 50 and 51 are connected to the inner ends of the two sections 10b, these cables being led into the fusilage where they are connected together by a short piece of sprocket chain 52. The sprocket chain passes over a sprocket wheel 53 on a shaft operated by a hand wheel 54. When the hand wheel is turned in one direction the cable 50 becomes slack and the lefthand closure 10b remains stationary, whereas the cable 51 is caused to exert a pull on the righthand closure 10b and thus shift it from its normal position; the normal positions of these two closures being their closed positions. Between an ear 55, on each closure to which the corresponding cable is fastened, and a fixed stop or abutment 56, is a compression spring 57 which normally holds the closure in its closed position. Therefore, when free to do so, these springs move the closures 10b into and yieldingly hold them in their closed positions. Each of the cables 50 and 51 may have associated therewith a resilient tension device 58 to take up the slack created in the manner just described.

It will be seen that by turning the wheel 54 in one direction, the tunnels controlled by the lefthand closure 10b are opened, while the corresponding tunnels on the opposite side of the airplane remain closed. Thus the lift on the lefthand wing is diminished and the greater lift on the righthand wing then causes the ship to tilt, the top of the left wing swinging down and that on the right wing rising. In this way the closures 10b are caused to do the work of the ailerons 4 or, if ailerons are desired, supplementing them. This adjustment of the closures 10b may also be utilized to level the craft in case it is unevenly loaded and tends to tip down on one side. By reducing the amount of lift on the lighter side the latter can be made to drop until a levelling of the wings is brought about.

For straight away flying at high speed it is desirable that the tunnels controlled by both of the closures 10b be opened. To accomplish this, two more cables 60 and 61 are connected to the closures 10b and brought into the fuselage where they are carried past opposite sides of and fastened to a drum or pulley 62. The drum or pulley may be rotated by a hand wheel 63. When this hand wheel is turned in one direction it winds up both cables, thus drawing both of the closures 10b toward the longitudinal center of the airplane and simultaneously opening the tunnels controlled thereby. When so operated, all of the tunnels may be utilized to decrease the air resistance of the wings just as in the first form. However, instead of having only two independent groups of tunnels in each wing, there are now three such groups.

Slack take-up devices 64 may be associated with the cables 60 and 61 as in the case of the cables 50 and 51. Also, additional springs 64, shown as tension springs, may be associated with the closures 10a and 10b, to assist the springs 57 in returning the closures to their normal closed positions, when permitted to do so.

It will thus be seen that my invention makes it possible for an airplane to fly at ordinary heights without meeting any greater resistance than would a similar airplane of ordinary construction that has risen into the stratosphere; thus making it unnecessary to fly at enormous heights in order to attain high speeds. On the other hand, if it should be desired to provide an airplane with short, thick wings, my invention makes this feasible through the capacity of the wings to be modified while in flight, to reduce their air resistance.

It should also be noted that the closure or gate devices at the front edges of the wings or planes are an aid in preventing, controlling and breaking ice formations which occur mainly along the front edges of the wings. Obviously, if the closure devices are simply moved back and forth after ice begins to form, it will be loosened and no large masses can be built up on the wings. Of course, interchangeable closures may be employed, and means be provided to heat one set and then substitute it for the set that is in use, so as to interfere with ice formation through heating of the front edges of the wings.

While I have illustrated and described with particularity only a single preferred form of my invention, with one single modification, I do not desire to be limited to the exact structural details thus illustrated and described; but intend to cover all forms and arrangements which come within the definitions of my invention constituting the appended claims.

I claim:

1. A wing or plane for air craft having straight parallel open-ended tunnels extending through the same from front to rear, and movable closures for said tunnels, said tunnels increasing gradually in size from their front ends toward the rear.

2. A wing or plane for air craft having straight parallel open-ended tunnels extending through the same from front to rear, said tunnels increasing gradually in size from their front ends toward the rear and movable closure devices at the front ends of said tunnels located and shaped to maintain the rounded streamline contour on the front edge of the wing when said devices are in their closed positions.

TAZEWELL H. JENKINS.